United States Patent

[11] 3,580,611

[72] Inventor Lewis F. McNitt
 Bay Village, Ohio
[21] Appl. No. 794,126
[22] Filed Jan. 27, 1969
[45] Patented May 25, 1971
[73] Assignee Midland-Ross Corporation
 Cleveland, Ohio

[54] FIFTH WHEEL SUPPORT SYSTEM
 3 Claims, 3 Drawing Figs.
[52] U.S. Cl..................................................... 280/433,
 280/106
[51] Int. Cl...................................................... B62d 53/08
[50] Field of Search.......................................... 280/423,
 433, 438—441, 407, 106

[56] References Cited
 UNITED STATES PATENTS
 2,903,275  9/1959  Walther..................... 280/407
 3,077,357  2/1963  Rugg.......................... 280/438

Primary Examiner—Leo Friaglia
Attorneys—Woodrow W. Portz and Irvin L. Groh

ABSTRACT: A right-angled or T-shaped element is secured to the web of a tractor (tractor-trailer combination) frame over its spring hanger supports. The flat area of the T is spaced from the channel flanges and the depending section may or may not extend into the area of spring hanger supports. If it does the spring hanger supports are initially made with an offset upper section into which the T-section can be inserted. The offset spring hangers can be originally provided with spacer elements which are removed when the dependent section of the T-element is positioned and secured to the frame web sections.

PATENTED MAY 25 1971 3,580,611
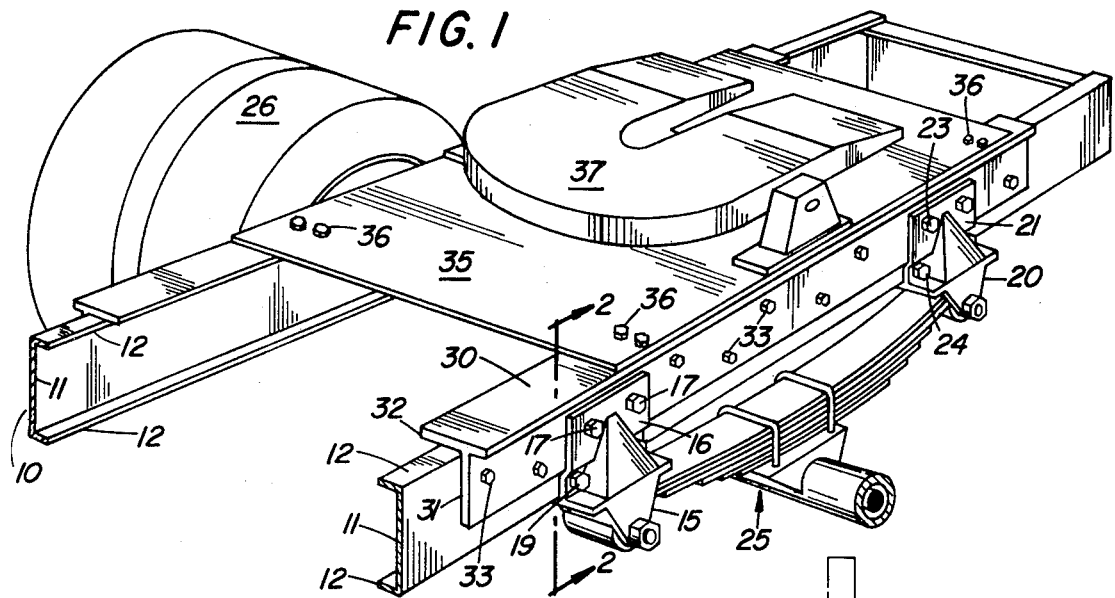
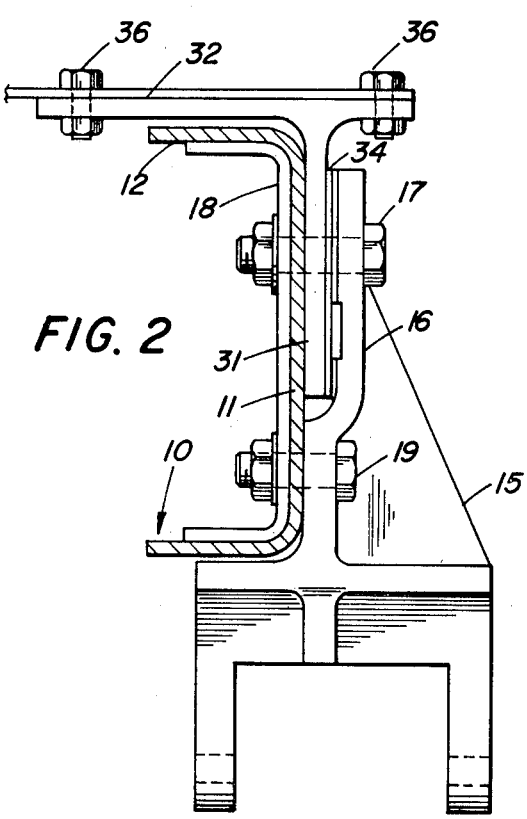
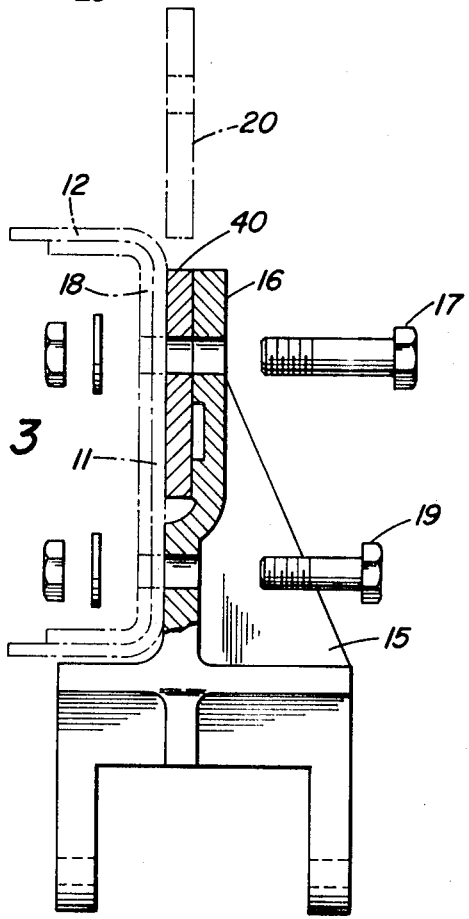
INVENTOR.
LEWIS F. McNITT
BY Thomas S. Mayner
ATTORNEY

FIFTH WHEEL SUPPORT SYSTEM

This invention relates to a flexible and positive support for a fifth wheel assembly. More specifically, it is directed to a fifth wheel mounting that is readily assembled into a tractor having originally installed offset spring hanger castings.

A review of a number of presently operating tractor-trailer units has disclosed almost as many methods for securing a fifth wheel bottom assembly. Many are improperly secured to the tractor frames as by U-bolts and some are merely bolted through the coupler plate and the top flange of the side rail. In such cases a heavily loaded trailer can and will shear the U-bolts upon a sudden stopping with possible resulting danger to the tractor, to the driver and occupants in other vehicles in the general vicinity.

The applicant herein submits a fifth wheel supporting assembly that will not weaken the side rails but will increase the strength of the tractor frame over the loading point of the trailer connection. Also the present assembly is easily installed since the tractor spring assembly already will have been provided with hanger castings adapted to receive a depending T-section or a side of a right-angled element on the top side of which the fifth wheel is adapted to rest. Since the tractor is properly preassembled only the upper set of bolts and the intervening spacers need be removed from the spring hangers for the installation of the depending legs of the aforesaid elements. The depending leg section is then bolted securely to the rail side only where no said rail strength is lost. Further, the tops of the angled members are spaced from the horizontal section of the rail thus they spread the trailer load over an extended length of the tractor frame. The coupler mounting plate is securely bolted onto the top of the angled members.

The advantages of the above-described novel assembly will be readily apparent by referring to the accompanying drawing and description, where:

FIG. 1 represents in perspective a fifth wheel mounted on the side rails of a tractor frame;

FIG. 2 is a section taken on line 2-2 of the assembly of FIG. 1; and

FIG. 3 is a cross section of a full and a partial disassembly similar to FIG. 2 before the installation of the fifth wheel support member showing the initial prior rear axle assembly spring hanger means.

Referring to the drawing there is shown a tractor frame assembly of like channels 10 having predetermined thickness and size to carry particular maximum loads. The parallel channels 10 have substantial web sections 11 and generally equal flanges 12. The channels 10 are generally transversely tied together by crossmembers (partly shown in FIGS. 2, 3) along their length for rigidity and strengthening purposes. Usually crossmembers also are used between opposing spring hangers.

Rear wheel and axle support is provided by means of cast steel spring hangers 15, 20 which are secured to the channel web 11 by forward bolts 17, 19 and rear bolts 23, 24, respectively. The spring hangers, in turn, support a spring axle assembly 25 which mounts such dual rear wheels as indicated at 26. It is usually preferred that the load be assumed by the web portion of the channels 10 forming the tractor frame and, as shown, transmitted therethrough to the hanger supports 15, 20 which sometimes are also spaced from the lower flange of the channel 10. The load transmittal to the wheels is through the bolts 17, 19, 23, 24, and the web 11.

The fifth wheel load as carried by the web 11 is spread thereover by right-angled members preferably like the T-shaped members 30 although right-angle members are also adequate. As shown, a right-angle or T-member 30 is positioned on a tractor frame side so that its horizontal or top section extends over and lengthwise of the channel 10 and flange 12 while its depending section 31 extends downwardly along the channel web 11. Bolts 33, as well as the bolts 17, 23 of the spring hangers 15, 20, secure the depending section of the T-member to the web 11 and, of course, the opposite T-member to the opposite parallel channel. The depending sections 31 extend into the upper sections of the spring hangers 15, 20.

The T-members 30, in turn, support the fifth wheel coupler mounting plate 35 on which is mounted the base or receiving fifth wheel assembly 37. The mounting plate 35 is firmly secured to the horizontal or top section 32 of the T-element by means of bolts 36. Since a T-element is secured to the web 11 of the channel 10 and its horizontal section is spaced from the channel's flange, the web then supports the fifth wheel assembly; and whatever load is carried by the assembly is distributed over the secured length of the T-element which may extend along the channels beyond the spring hangers 15, 20.

The final assembly is specifically shown in the cross section depicted by FIG. 2. As stated hereinbefore, there can be a crossmember 18 as an additional stiffening and strengthening means used at each opposing spring hanger position. In the cross section shown, such a crossmember 18, is, advantageously bolted into position by the same bolt assemblies 17, 19, for example, that secure the depending T-section 31. The T-member 30 is spaced from the flange 12 but is bolted flush with the channel web 11. To accommodate the T-leg 31 the hanger bracket 15 has an offset for a designed upper distance as 16. Spacers 34 can be used to take up any space that may prevent a snug fit.

The chassis builder and assembler of tractor frames may prepare the tractor for subsequent addition of a fifth wheel mount. Such an initial assembly is shown in FIG. 3. In such instance he will add the offset 16 spring hangers 15 as a standard item including, however, an initial spacer element 40 which is subsequently replaced by the depending section 31 of the T-member 30. Only the upper bolt 17 of the hanger 15 and 23 of the rear hanger 20 need be removed and the remaining spring hanger assembly need not be disturbed. An installation means only the removal of the upper bolts 17, 23 and of the spacers 40 with replacement of them by the T-member leg 31. The depending section or leg 31, of course, must be drilled for sufficient bolts through the channel web 11 and, of course, the same must be done for the coupler plate 35 to accept the bolts 36 through the top of the T-member.

I claim:

1. A fifth wheel support assembly in combination with a tractor channel frame on which are mounted tractor spring hanger supports comprising a right-angle-shaped member mounted on each side of said tractor frame and over said hanger supports having a length about at least equal to the distance between said spring hanger supports, the depending section of said right-angle-shaped member extending substantially downwardly over and in contact with the web section of the channels and partly into the spring hanger supports and the top flat section being spaced away from the flange section of said channels, the depending section of said right-angle member being secured to the said web section, and the fifth wheel assembly being secured to rest on the right-angle-shaped members.

2. A fifth wheel support assembly in combination with a tractor channel frame on which are mounted tractor spring hanger supports comprising partly offset spring hanger supports securable to the channel sides, the offset section admitting a subsequently inserted depending section of a T-member, a T-shaped member mounted on each side of said tractor frame and over said hanger supports having a length about at least equal to the distance between said spring hanger supports, the depending section of said T-shaped member extending substantially downwardly over the web section of the tractor channels and into the offset part of said hanger supports and the top flat section spaced away from the flange section of said frame channels, the depending section of said T-member being secured to the said web section, and the fifth wheel assembly being secured to rest on the T-shaped members.

3. A fifth wheel support assembly in combination with a tractor channel frame on which are mounted tractor spring hanger supports comprising partly offset spring hanger supports securable to the channel sides, the offset section of each hanger admitting a subsequently inserted depending section of a right-angle-shaped member, a right-angle-shaped member mounted on each side of said tractor frame and over said hanger supports having a length at least equal to the distance between said hanger supports, the depending section of each of said right-angle-shaped members extending substantially downwardly over the adjacent channel side into said offset part of the receiving hanger support, said depending section of each right-angle-shaped member being secured to the adjacent channel side, and the fifth wheel assembly being secure to rest on the right-angle-shaped members.